US007033425B2

(12) United States Patent
Blease et al.

(10) Patent No.: US 7,033,425 B2
(45) Date of Patent: Apr. 25, 2006

(54) INK JET INK SET

(75) Inventors: James W. Blease, Avon, NY (US); Steven Evans, Rochester, NY (US); Joan C. Potenza, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/824,693

(22) Filed: Apr. 15, 2004

(65) Prior Publication Data

US 2005/0229810 A1 Oct. 20, 2005

(51) Int. Cl.
*C09D 11/02* (2006.01)

(52) U.S. Cl. ............... 106/31.5; 106/31.27; 106/31.58; 106/31.52

(58) Field of Classification Search ............... 106/31.5, 106/31.27, 31.58; 534/752
See application file for complete search history.

(56) References Cited

U.S. PATENT DOCUMENTS

| | | | | |
|---|---|---|---|---|
| 5,679,140 | A | 10/1997 | McInerney et al. | 106/31.27 |
| 5,725,641 | A | 3/1998 | MacLeod | 106/31.5 |
| 6,136,080 | A * | 10/2000 | Evans et al. | 106/31.5 |
| 6,183,548 | B1 * | 2/2001 | Erdtmann et al. | 106/31.48 |
| 6,302,949 | B1 | 10/2001 | Peter | 106/31.52 |
| 6,468,338 | B1 | 10/2002 | Evans et al. | 106/31.5 |
| 6,513,932 | B1 | 2/2003 | Ehrne et al. | 347/100 |
| 6,685,768 | B1 * | 2/2004 | Blease et al. | 106/31.47 |
| 6,855,195 | B1 * | 2/2005 | Nishita et al. | 106/31.48 |
| 2001/0027734 | A1 | 10/2001 | Geisenberger et al. | 106/31.52 |
| 2003/0061963 | A1 * | 4/2003 | Blease et al. | 106/31.27 |
| 2004/0128775 | A1 * | 7/2004 | Wuzik et al. | 8/583 |
| 2005/0076806 | A1 * | 4/2005 | Hanmura et al. | 106/31.48 |
| 2005/0087100 | A1 * | 4/2005 | Blease et al. | 106/31.47 |
| 2005/0126431 | A1 * | 6/2005 | Potenza et al. | 106/31.5 |

FOREIGN PATENT DOCUMENTS

| | | | |
|---|---|---|---|
| EP | 1 197 535 | A2 | 4/2002 |
| EP | 1 281 736 | A1 | 2/2003 |
| JP | 1998259334 | A | 9/1998 |
| JP | 2003221534 | A | 8/2003 |

OTHER PUBLICATIONS

U.S. Appl. No. 10/732,093, filed Dec. 10, 2003, DN84265 Solubilized Yellow Dyes for Inks With Improved Ozone and Light Stability by Schmitthenner, Hans F.et al.

* cited by examiner

*Primary Examiner*—Helene Klemanski
(74) *Attorney, Agent, or Firm*—Sarah Meeks Roberts

(57) ABSTRACT

This invention relates to an ink jet ink set comprising; A) a cyan ink comprising an aqueous vehicle and a sulfonated copper phthalocyanine dye, B) a magenta ink comprising an aqueous vehicle and an azo-naphthol derivative magenta dye, a metal complex magenta dye, or a anthrapyridone magenta dye or mixtures thereof, C) a yellow ink comprising an aqueous vehicle and a pyrazoleazoindole yellow dye or azo pyrazole-azole yellow dye or mixtures thereof and D) a black ink comprising an aqueous vehicle and a metal complex black dye.

44 Claims, No Drawings

INK JET INK SET

FIELD OF THE INVENTION

This invention relates to inks for ink jet printing that provide images with excellent image color and good light fastness on laminated recording materials.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant that is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier recording materials include water, mixtures of water and organic co-solvents and high boiling organic solvents, such as hydrocarbons, esters, ketones, etc.

For aqueous dye-based inks, the dyes needs to be sufficiently soluble in water to prepare a solution that is capable of producing adequate density on the receiving element and stable for extended periods of storage without precipitation. High quality ink jet printing with dye-based inks requires dyes that will provide both bright hue and good light fastness.

To generate full color prints via ink jet printing, ink sets comprising at least cyan, magenta and yellow inks are normally utilized. In addition a black ink is often added to enhance the printing of text and darker colors. The range of colors that can be produced with a given set of inks defines the color gamut of that ink set. For the production of high quality photorealistic images via ink jet printing, ink sets with a large color gamut are preferred. In addition, it is important that the ink sets produce images with good fastness, especially to light.

The choice of the colorants in ink jet systems is critical for both light fastness and color gamut. The color gamut of an ink set is controlled primarily by the spectral absorption characteristics of the component dyes. The primary dyes (e.g., cyan, magenta and yellow) should only absorb light of the required wavelengths (i.e., have relatively narrow absorption bands) and not overlap excessively with the dyes in the complementary inks.

Of particular importance is the light fastness of the component dyes when printed on recording materials that are subsequently sealed with a laminating film. Lamination is done to protect the printed image from physical damage and also to further enhance the stability of the printed image against light fade and fade due to environmental pollutants such as ozone.

Recording material laminate films are available in a variety of forms and can be categorized based on their mode of adhesion to the printed recording material. These forms include heat activated laminates, thermal laminates and pressure sensitive laminates. Laminate films can contain ultraviolet light absorbing compounds that can in part protect the printed dyes from fade due to ultraviolet light.

Numerous dye based ink jet ink sets have been described in patent literature with varying performance in terms of color gamut and light fastness on laminated media. In order to achieve a high color gamut, U.S. Pat. No. 5,679,140 describes preferred spectral characteristics for dyes used in ink jet ink sets. In particular, specifications are given for the preferred spectral characteristics of yellow dyes. However, the patent indicates no preference for selection of black dyes and does not address the need for good laminated light fastness for the set of dyes in the ink jet ink set.

Water soluble, metal complex black dyes are known in the art to have good light fastness and are described in for example U.S. Pat. No. 5,725,641, U.S. Pat. No. 6,302,949 B1 and U.S. patent application Publication No. 2001/0027734A1. The latter patent application discloses use of a trisazo metal complex black dye in an ink jet ink set with cyan, magenta and yellow dyes. However, the yellow dyes cited in 2001/0027734A1 have neither the preferred spectral characteristics to achieve a high color gamut nor high light fastness.

U.S. Pat. No. 6,468,338 B1 describes water soluble pyrazoleazoindole yellow dyes with good light fastness although no preference is indicated for the other dyes in an ink jet ink set. Likewise, U.S. patent application Publication Ser. No. 10/732,093, filed Dec. 10, 2003, describes water soluble azo pyrazole-azole yellow dyes with good light fastness without describing other preferred dyes to complete an ink jet ink set.

There is still needed an ink set capable of producing images with excellent color and also with high light fastness when printed on laminated recording materials.

SUMMARY OF THE INVENTION

The present invention provides an ink jet ink set comprising:

a) a cyan ink comprising a carrier and a sulfonated copper phthalocyanine dye;

b) a magenta ink comprising a carrier and an anthrapyridone magenta dye, a metal complex magenta dye, or an azo-naphthol derivative magenta dye or mixtures thereof;

c) a yellow ink comprising a carrier and an azo pyrazoleazole yellow dye of the following Structure (I):

I

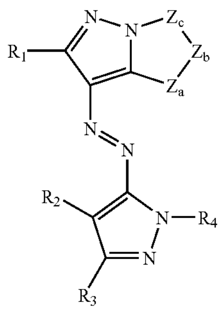

(I)

wherein $R_1$ represents a hydrogen atom, a cyano group, an alkyl group, a cycloalkyl group, an alkenyl group, anaralkyl group, an aryl group, an alkylthio group, an arylthio group, an acyl group, a, a carboxyl group, a carbamoyl group, or a heterocyclic group;

Za, Zb and Zc each independently represents —N═, —C($R_8$)═ or NH with the proviso that at least one of Za or Zc is —NH; $R_8$ represents a hydrogen, an alkyl group, an alkenyl group, an alkynyl group, an aryl group or a heterocyclic group $R_2$ represents a hydrogen, an alkyl group, an aryl group, a halogen, a cyano group, a carboxyl group, an acyl group, a carbamoyl group, a nitro group, an alkyl or aryl sulfone group, a sulfonic acid group, a primary or secondary alkyl sulfonamide group, a aryl sulfonamide group or a heteroaryl group;

$R_3$ is a hydrogen or any non-metallic group;

$R_4$ is hydrogen, an alkyl group, a cycloalkyl group, an alkenyl group, an aralkyl group, an alkynyl group, an aryl group, a heterocyclic group, a urethane, a sulfoalkyl or sulfoaryl group;

or a pyrazoleazoindole yellow dye of the following structure (II);

(II)

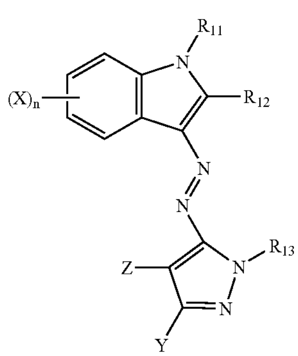

wherein $R_{11}$ and $R_{13}$ each independently represents hydrogen, an alkyl group of 1–6 carbon atoms, an allyl group, an aryl group of 6–10 carbon atoms, a heteroaryl group of 5–10 atoms or a polyoxyalkylene group of 2–20 alkylene oxide residues;

$R_{12}$, X and Y each independently represents hydrogen, an alkyl group of 1–6 carbon atoms, an allyl group, an aryl group of 6–10 carbon atoms, a heteroaryl group of 5–10 atoms or a polyoxyalkylene group of 2–20 alkylene oxide residues; a halogen, a cyano group, a carboxy group, an acyl group, a nitrogroup, a sulfo group, an alkoxy group of 1–6 carbon atoms, an aryloxy group of 6–10 carbon atoms, an alkoxy- or aryloxy-carbonyl group of 1–10 carbon atoms, a ureido group, a carbamoyl group, an alkyl-, arylalkyl-, aryl-, diaryl- or dialkyl-carbamoyl group of 1–20 carbon atoms, a sulfamoyl group, an alkyl-, arylalkyl-, aryl-, diaryl- or dialkyl-sulfamoyl group of 1–20 carbon atoms, an alkyl- or arylsulfonyl group, an acylamino group, a sulfonylamino group, an amino group, or an alkyl-, aralkyl-, aryl-, diaryl- or dialkyl-amino group of 1–20 carbon atoms;

n represents an integer from 1–4; and Z represents a cyano group, a carboxy group, a sulfo group, an alkoxycarbonyl group, a carbamoyl group, a sulfamoyl group, an alkyl- or arylsulfonyl group, an alkyl-, arylalkyl-, aryl-, diaryl- or dialkyl-sulfamoyl group of 1–20 carbon atom or an alkyl-, arylalkyl-, aryl-, diaryl- or dialkyl-carbamoyl group of 1–20 carbon atoms; with the proviso that the dye of structure (I) and (II) must contain at least one group capable of imparting water solubility at a pH of about 4–9; or mixtures of (I) and (II) above; and (d) a black ink comprising a carrier and a metal complex black dye.

It further provides a printing method utilizing the above inkjet ink set.

An ink jet ink set comprising the above cyan, magenta, yellow and black dyes provides excellent image color and light fastness on laminated ink jet receivers.

DETAILED DESCRIPTION OF THE INVENTION

Any copper phthalocyanine cyan dye or mixture thereof may be used in the cyan ink. In a preferred embodiment the cyan dye is C. I. Direct Blue 86, C. I. Direct Blue 199, Bayer Bayscript® BA, BASF Basacid® 762, or C. I. Direct Blue 307 (available as Avecia Pro-Jet® Fast Cyan 2).

Any metal complex magenta dye or anthrapyridone magenta dye or azo-naphthol derivative magenta dye or mixtures thereof may be used in the magenta ink. In a preferred embodiment the metal complex magenta dye is Kodak Lightfast Magenta 1 (CAS #251959-65-6), C. I. Reactive Red 23, or pacified C. I. Reactive Red 23, the azo-naphthol derivative magenta dye is C. I. Reactive Red 31, pacified Reactive Red 31, or Ilford Magenta M-377 (CAS #182061-89-8), and the anthrapyridone magenta dye is Nippon Kayaku JPD EK-1 (CAS#224628-70-0), Acid Red 80, Acid Red 82 or CAS#212080-60-9.

Any azo pyrazoleazo yellow dye of the following Structure (I) may be used in the yellow ink:

I

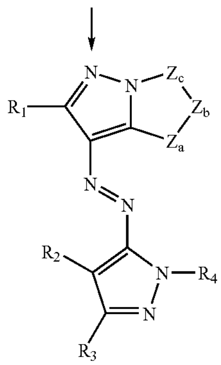

$R_1$ represents a hydrogen atom, a cyano group, an alkyl group, a cycloalkyl group, an alkenyl group, an aralkyl group, an aryl group, an alkylthio group, an arylthio group, an acyl group, a carboxyl group, a carbamoyl group, or a heterocyclic group. Preferably $R_1$ is an alkyl group. In a preferred embodiment, $R_1$ is a tertiary butyl group.

Za, Zb and Zc each independently represents —N═, —C($R_8$)═ or NH with the proviso that at least one of Za or Zc is —NH; $R_8$ represents a hydrogen, an alkyl group, an alkenyl group, an alkynyl group, an aryl group or a heterocyclic group $R_2$ represents a hydrogen, an alkyl group, an aryl group, a halogen, a cyano group, a carboxyl group, an acyl group, a carbamoyl group, a nitro group, an alkyl or aryl sulfone group, a sulfonic acid group, a primary or secondary alkyl sulfonamide group, a aryl sulfonamide group or a heteroaryl group. Preferably $R_2$ is a cyano group, an acyl group, a carboxy or carboalkoxy group, or a sulfone. $R_3$ is a hydrogen or any non-metallic group. Preferably $R_3$ is H or an alkyl group having four or fewer carbon atoms. $R_4$ is hydrogen, an alkyl group, a cycloalkyl group, an alkenyl group, an aralkyl group, an alkynyl group, an aryl group, a heterocyclic group, a urethane, a sulfoalkyl or sulfoaryl group. In one preferred embodiment $R_1$ is an alkyl group, $R_2$ is a cyano group, an acyl group, a carboxy or carboalkoxy group, or a sulfone; and $R_3$ is H or an alkyl group having four or fewer carbon atoms.

In a preferred embodiment the azo pyrazoleazole yellow dye is represented by structure Ia or Ib:

Ia

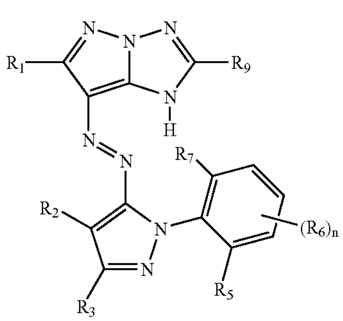

-continued

Ib

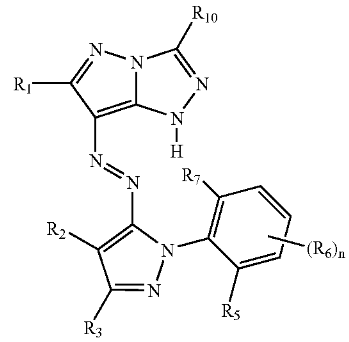

wherein $R_1$, $R_2$, and $R_3$ are as defined above. $R_5$, $R_6$, $R_7$ may independently be H or any non-metallic group such as, but not limited to those defined above for $R_2$, with the proviso that at least one of $R_5$ or $R_7$ represents an ionizable group which is capable of imparting water solubility to the dye. In the alternative $R_5$ and $R_6$ or $R_6$ and $R_7$ together may form a carbocyclic or heterocyclic ring that is fused to the aromatic ring attached to the pyrazole nitrogen, with the proviso that at least one group capable of imparting water solubility to the dye is present in any position of either fused ring. Any two adjacent $R_6$ may also form a carbocyclic or heterocyclic ring that is fused to the aromatic ring attached to the pyrazole nitrogen in any two adjacent positions not occupied by $R_5$ or $R_7$, with the proviso that at least one of $R_5$ or $R_7$ represents an ionizable group which is capable of imparting water solubility to the dye. $R_6$ may be present in any other position on the aromatic ring that is not occupied by $R_5$ or $R_7$. For (R6)n, n=0–3

Preferably at least one, and more preferably, at least two of $R_5$, $R_6$ and $R_7$ is a sulfonate, sulfinate, carboxylate, hydroxyl, phosphonate, or substituted sulfonamide. More preferably $R_5$ or $R_7$ is a sulfonate group and $R_6$ is a sulfonate or carboxylate group in a position para to the $R_5$ or $R_7$ group.

$R_9$ represents a hydrogen, an alkyl group, an alkenyl group, an alkynyl group or a heterocyclic group; and more preferably $R_9$ represents a hydrogen, an alkyl group or an alkenyl or alkynyl group. Preferably $R_9$ is an alkyl group. In one embodiment $R_9$ represents a branched or straight chain alkyl group of up to 8 carbons and is substituted with a phenoxy group. In a preferred embodiment $R_9$ and $R_1$ are alkyl groups. In a more preferred embodiment $R_9$ represents a branched or straight chain alkyl group of up to 8 carbons substituted with a phenoxy group, and $R_1$ is a t-butyl group.

$R_{10}$ represents a hydrogen, an alkyl group, a heterocyclic group, or an alkenyl group. Preferably $R_{10}$ is an alkyl group. In one embodiment $R_1$ and $R_{10}$ are alkyl groups. More preferably $R_{10}$ represents an alkyl group in which the carbon adjacent to the heterocyclic ring is substituted to the extent that it bears no more than one hydrogen atom. In a preferred embodiment, $R_{10}$ represents an alkyl group of one to three carbons, in which each carbon is tetrasubstutited.

The yellow dye may also be a pyrazoleazoindole yellow dye of the following structure (II);

(II)

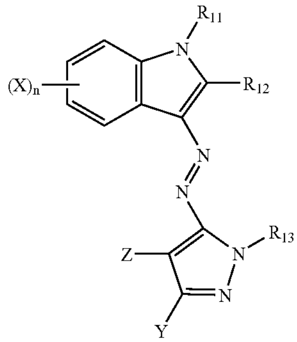

wherein $R_{11}$ and $R_{13}$ each independently represents hydrogen, an alkyl group of 1–6 carbon atoms, an allyl group, an aryl group of 6–10 carbon atoms, a heteroaryl group of 5–10 atoms or a polyoxyalkylene group of 2–20 alkylene oxide residues. In a preferred embodiment of the invention, $R_{11}$ in the above formula represents hydrogen, a methyl group or a 2-carboxyethyl group. In yet another preferred embodiment, $R_{13}$ represents a 4-sulfophenyl group, a 2,5-bis-sulfophenyl group, a methyl or phenyl group, a 4-carboxyphenyl group or a 3-sulfopropyl group.

$R_{12}$, X and Y each independently represents hydrogen, an alkyl group of 1–6 carbon atoms, an allyl group, an aryl group of 6–10 carbon atoms, a heteroaryl group of 5–10 atoms or a polyoxyalkylene group of 2–20 alkylene oxide residues; a halogen, a cyano group, a carboxy group, an acyl group, a nitro group, a sulfo group, an alkoxy group of 1–6 carbon atoms, an aryloxy group of 6–10 carbon atoms, an alkoxy- or aryloxy-carbonyl group of 1–10 carbon atoms, a ureido group, a carbamoyl group, analkyl-, arylalkyl-, aryl-, diaryl- or dialkyl-carbamoyl group of 1–20 carbon atoms, a sulfamoyl group, an alkyl-, arylalkyl-, aryl-, diaryl- or dialkyl-sulfamoyl group of 1–20 carbon atoms, an alkyl- or arylsulfonyl group, an acylamino group, a sulfonylamino group, an amino group, or an alkyl-, aralkyl-, aryl-, diaryl- or dialkyl-amino group of 1–20 carbon atoms; In a preferred embodiment, $R_{12}$ represents a methyl or phenyl group. In still another preferred embodiment, X represents hydrogen, sulfo, a substituted 1,3,5-triazinylamino group or an N-alkylphthalamido group. In yet another preferred embodiment, Y represents hydrogen.

n represents an integer from 1–4; and Z represents a cyano group, a carboxy group, a sulfo group, an alkoxycarbonyl group, a carbamoyl group, a sulfamoyl group, an alkyl- or arylsulfonyl group, an alkyl-, arylalkyl-, aryl-, diaryl- or dialkyl-sulfamoyl group of 1–20 carbon atom or an alkyl-, arylalkyl-, aryl-, diaryl- or dialkyl-carbamoyl group of 1–20 carbon atoms. In still yet another preferred embodiment Z represents cyano, carboxy or carbamoyl.

In one preferred embodiment $R_{11}$ is hydrogen, methyl or 2-carboxyethyl; $R_{12}$ is methyl or phenyl; X is hydrogen, sulfo, a substituted 1,3,5-triazinylamino group or an N-alkylphthalamido group; $R_{13}$ is a 4-sulfophenyl, 2,5-bis-sulfophenyl, methyl, phenyl, 4-carboxyphenyl or 3-sulfopropyl group; Y represents hydrogen and Z is a cyano, carboxy or carbamoyl group.

The dyes of structure (I) and the dyes of structure (II) must contain at least one group capable of imparting water solubility at a pH of about 4–9. In a preferred embodiment, the above dyes have adequate water solubility to enable preparation of an ink formulation containing between 0.2% and 10% dye. Examples of groups capable of imparting water solubility at a pH of about 4–9 include sulfonic, sulfinic, phosphonic, phosphoric and carboxylic acid moieties and salts thereof; primary, secondary and tertiary amino groups; and quaternary ammonium or phosphonium groups. Mixtures of yellow dyes (I) and (II) may be used.

In a more preferred embodiment, the pyrazoleazoindole yellow dye has the following structure:

Dye A

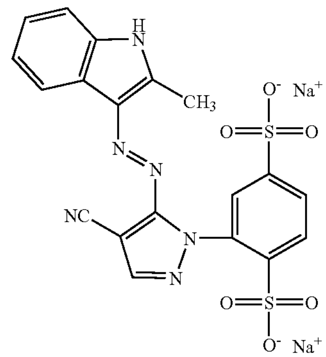

In yet another preferred embodiment, the azo pyrazoleazole yellow dye has one of the following structures:

Dye B

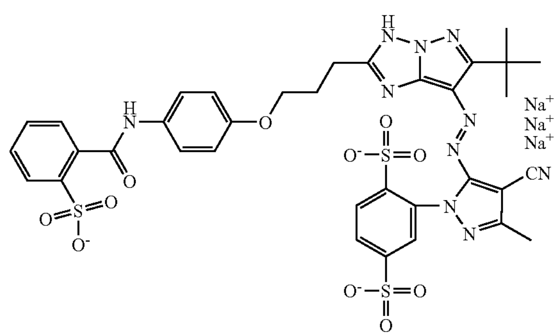

Dye C

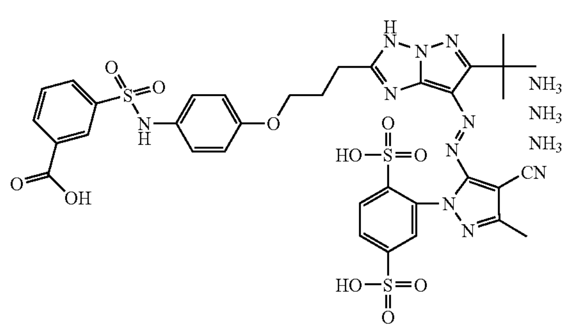

The yellow dyes above may be used as their free acids, or may be partially or fully ionized and associated with a counterion or counterions if necessary. Any counterion that affords a dye with the required solubility may be used. Examples of suitable counterions are sodium, lithium, ammonium, potassium, trialkylamonium or pyridinium
Additional examples of the azo pyrazoleazole dyes are:
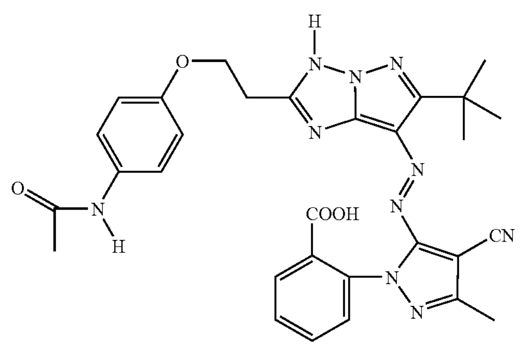
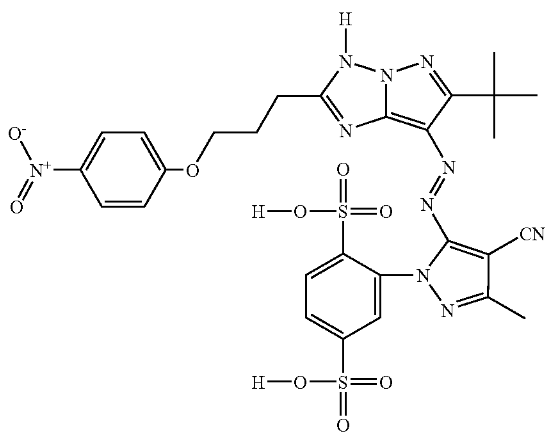
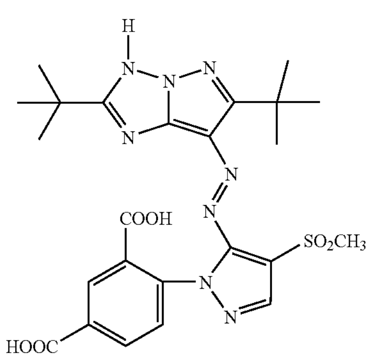
-continued
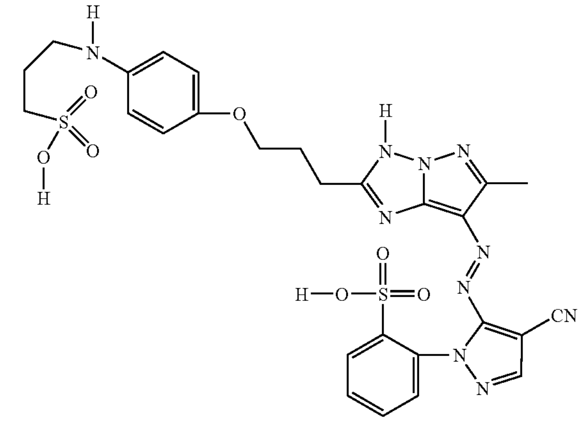
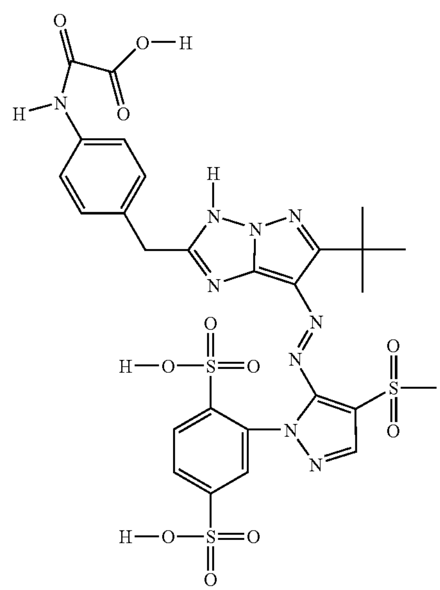
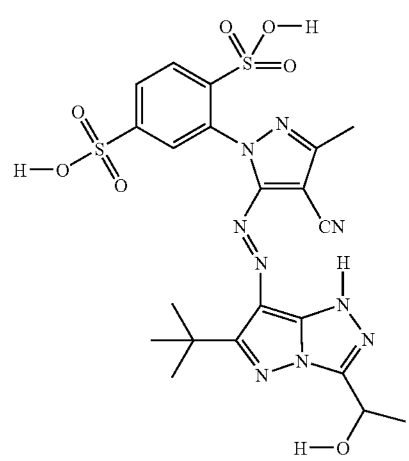

-continued
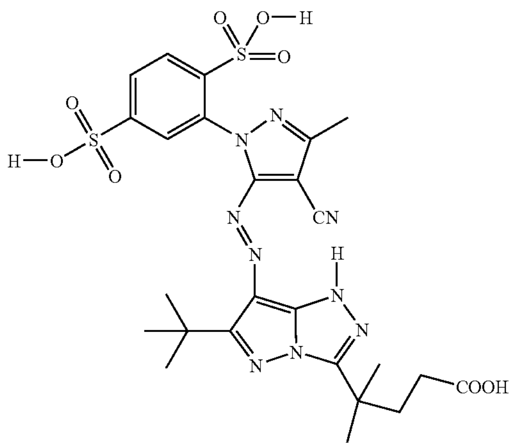
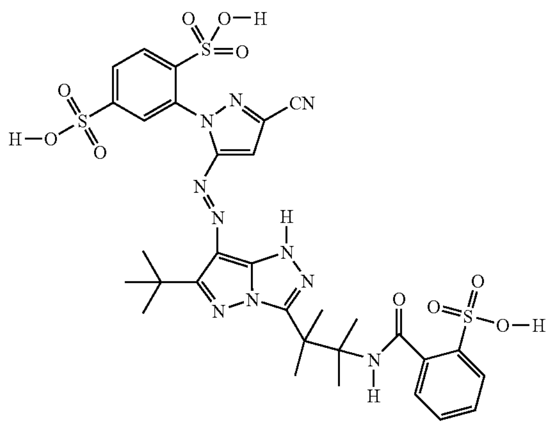
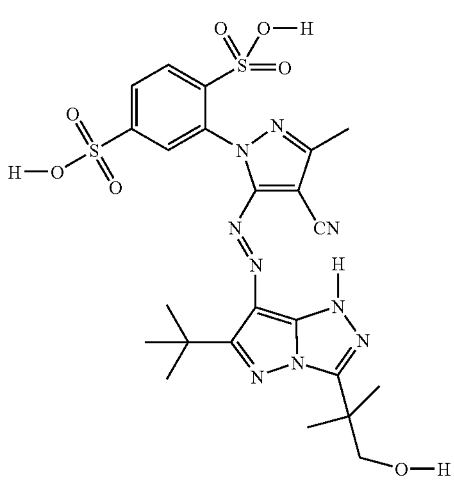
-continued
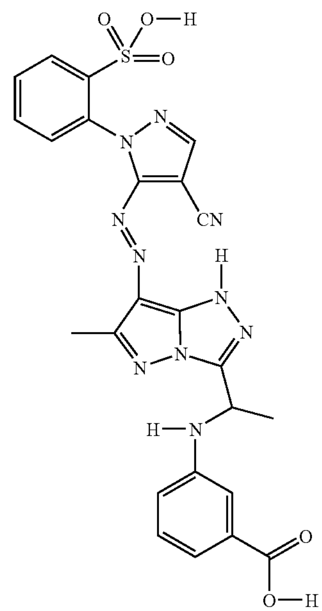
Any metal complex black dye or mixtures thereof may be used in the black ink. Particularly suitable dyes include a) Reactive Black 31 and b) Pacified C. I. Reactive Black 31 represented by Structure III, IV, or V:
(III)
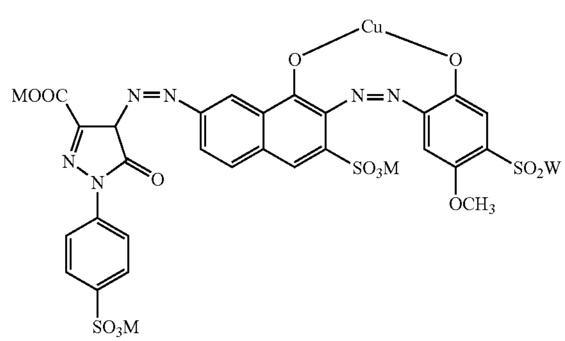
wherein W is —$CH_2CH_2$—OH, —CH═$CH_2$, an aminoalkyl group; or a sulfoalkyl group, (IV)

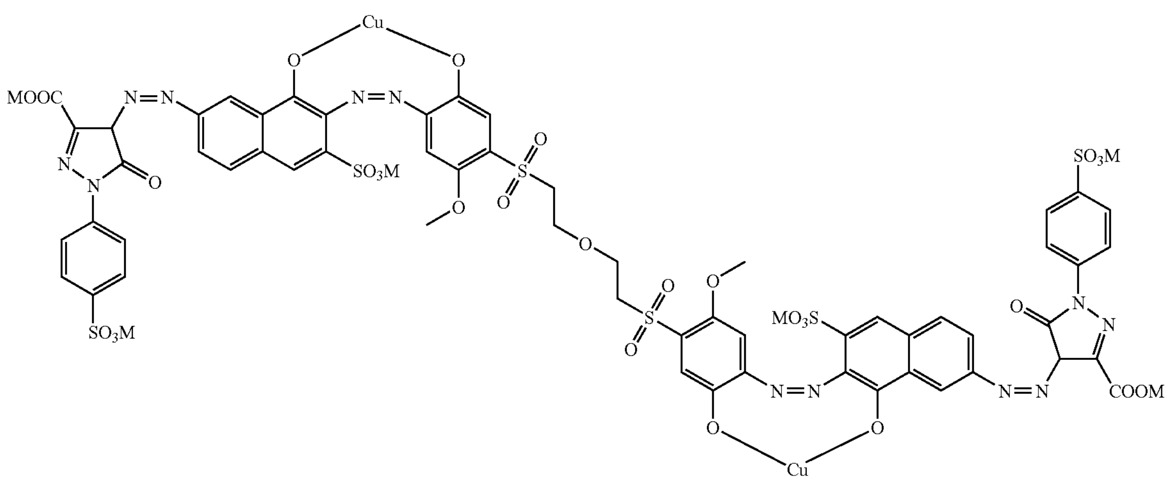

(V)

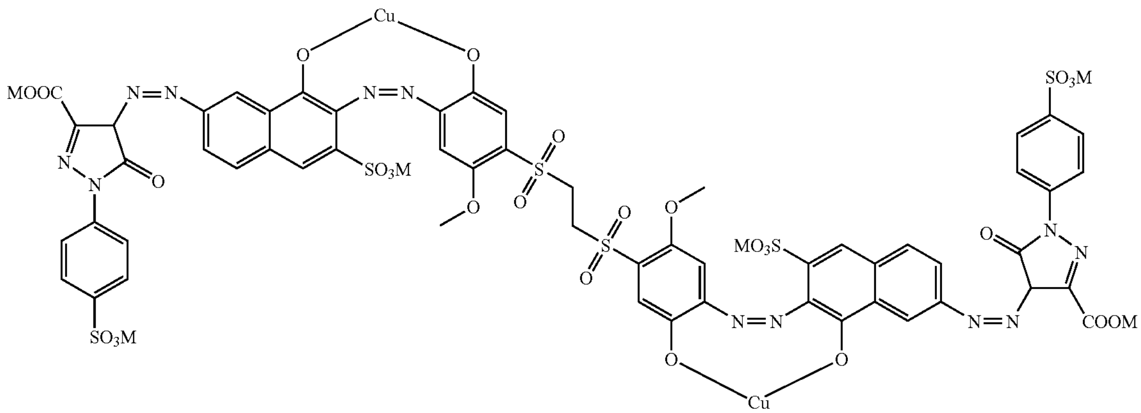

and M is H, Li, Na, K, $NH_4$ or alkylammonium or any combination thereof

Another useful black dye is a metal complex bisazo black dye represented by Structure (VI):

(VI)

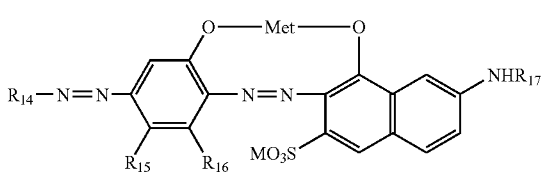

where $R_{14}$ is a phenyl group or naphthyl group;

$R_{15}$ is H, an alkyl group or an alkoxy group with 1 to 18 carbon atoms, an amino group, a halo group, a trifluoromethyl group, a carboxy group, a sulfo group, a carbamido group, an alkylcarbonylamino or arylcarbonylamino group; $R_{16}$ is hydrogen or $R_{15}$ forms together with $R_{16}$ and the phenylene ring a 1,4-naphthylene moiety, which can be unsubstituted or substituted in position 6 or 7;

$R_{17}$ is H, an alkyl group with 1 to 18 carbon atoms, a cycloalkyl group, a heterocyclic alkyl group, an aryl group, an aralkyl group, a saturated or unsaturated aza, oxa or hetercyclic radical;

M is hydrogen, a metal cation, an ammonium cation, or an ammonium cation substituted with an alkyl, alkoxyalkyl or hydroxyalkyl radical each having 1 to 12 carbon atoms; and Met is Cu, Ni, or Zn.

Also useful are trisazo metal complex black dyes represented by Structure (VII):

(VII)

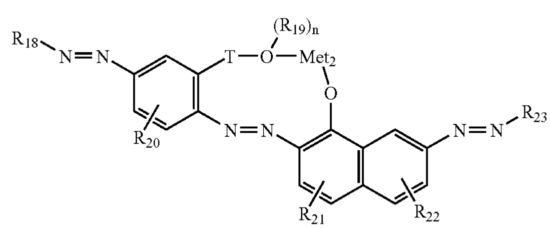

wherein $Met_2$ is a metal atom; $R_{18}$ is a phenyl or naphthalene radical substituted by 1, 2 or 3 substituents selected from the group consisting of OH, an O(alkyl) group having 1 to 6 carbon atoms, COOM, $SO_3M$ and $NH_2$;

$R_{19}$ is an alkyl group of 1 to 6 carbon atoms,

T is a chemical bond or —CO— or —$SO_2$—;

$R_{20}$ is H, a methyl group or an O(alkyl) group having 1 to 6 carbon atoms;

$R_{21}$ and $R_{22}$ are each independently H, COOM or $SO_3M$;

$R_{23}$ is a phenyl group, a pyridyl or pyrazole radical substituted by 1,2 or 3 substituents selected from the group consisting of OH, an O(alkyl) group having 1 to 6 carbon atoms, COOM, $SO_3M$, $NH_2$, an NHaryl group, an NHacyl group and a phenylsulfo group;

n is 0 or 1, and M is ammonium, H, K, Li, or Na. Mixtures of any number of dyes a), b), c), or d) may be used.

Particularly useful black inks are those wherein the black ink comprises a carrier and pacified reactive black 31 or a dye of structure VIII or structure IX or mixtures thereof:

VIII

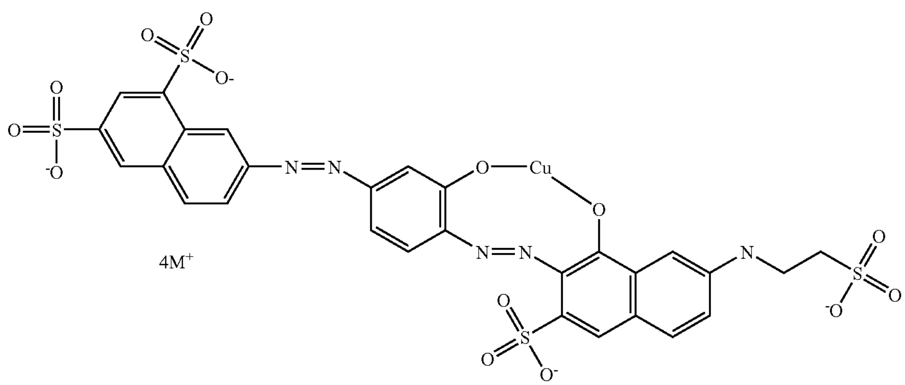

IX

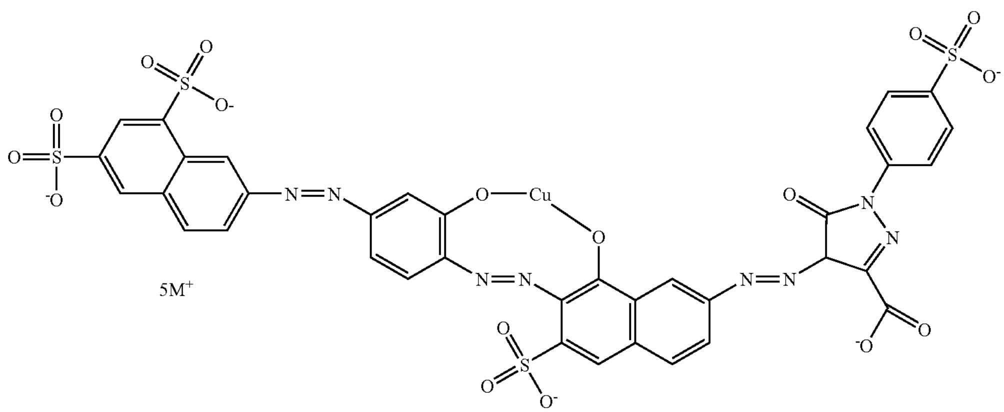

wherein M in is Li, Na, K, $NH_4^+$ alkylammonium or any combination thereof.

In a preferred embodiment, the metal complex dye is pacified Reactive Black 31, Ilford K-1334 or Clariant Duasyn® Black NB-SF. The black ink may also be adjusted for color by addition of a copper phthalocyanine cyan dye, a metal complex magenta dye, an anthrapyridone magenta dye, an azo-naphthol derivative magenta dye, a pyrazoleazoindole yellow dye, a pyrazolazol yellow dye, an azoaniline yellow dye, a metal complex yellow dye, an orange dye, a green dye, a violet dye or mixtures thereof.

Unless otherwise specifically stated, substituent groups or radicals which may be substituted on molecules herein include any groups, whether substituted or unsubstituted, which do not destroy properties necessary for ink jet printing utility. When the term "group" or "radical" is applied to the identification of a substituent containing a substitutable hydrogen, it is intended to encompass not only the substituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy)propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido,-N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-toluylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-( 2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy) acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfonyl, 4-nonylphenylsulfonyl, and p-toluylsulfonyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3- to 7-membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired ink jet printing properties for a specific application and can include, for example, hydrophobic groups, solubilizing groups, blocking groups, releasing or releasable groups, etc.

In the above dye descriptions, examples of an alkyl group include methyl, ethyl, isopropyl, hydroxyethyl, 3-sulfopropyl and m-carboxybenzyl. Examples of an aryl group include phenyl, naphthyl, 3,5-biscarboxyphenyl and 4-sulfophenyl. Examples of a heteroaryl group include pyridyl, imidazolyl and quinolyl. Examples of halogen include chloro, fluoro, bromo and iodo. Examples of an acyl group include acetyl and 4-sulfobenzoyl. Examples of an alkoxy group include methoxy, 3-carboxypropoxy and 2-hydroxyethoxy. Examples of an aryloxy group include phenoxy, 3-carboxyphenoxy and 4-sulfophenoxy. Examples of an alkoxy- or aryloxy-carbonyl group of 1–10 carbon atoms include methoxycarbonyl, ethoxycarbonyl, 2-methoxyethoxycarbonyl and 3-sulfophenoxycarbonyl. Examples of an alkyl- aralkyl-, aryl-, diaryl- or dialkyl carbamoyl group include N-methylcarbamoyl, N-methyl-N-4-sulfophenylcarbamoyl, N,N-bis(4-carboxyphenyl)carbamoyl. Examples of an alkyl-aralkyl-, aryl-, diaryl-or dialkyl sulfamoyl group include N-methylsulfamoyl, N-methyl-N-phenyl-sulfamoyl, N-(p-sulfophenyl)sulfamoyl and N,N-bis(4-carboxyphenyl) sulfamoyl. Examples of an acylamino group include acetamido, methoxyethylacetamido and 3-carboxybenzamido. Examples of a ureido group include N-methylureido, ureido and N,N'-dimethylureido. Examples of a sulfonylamino group include methanesulfonamido, p-toluenesulfonamido and 2-sulfatoethanesulfonamido. Examples of an alkyl-aralkyl-, aryl- diaryl- or dialkylamino group include methylamino, N,N-dimethylamino, methoxy-ethylamino and 3-sulfoanilino.

In one embodiment the ink set further comprises a light cyan ink and a light magenta ink. Preferably the light cyan ink comprises a carrier and a sulfonated copper phthalocyanine dye. More preferably the light cyan ink comprises a carrier and C. I. Direct Blue 86, C. I. Direct Blue 199, or C. I. Direct Blue 307 or mixtures thereof. Preferably the light magenta ink comprises a carrier and an anthrapyridone magenta dye, a metal complex magenta dye or an azo-naphthol derivative magenta dye, or a mixture thereof. More preferably the light magenta ink comprises a carrier and Kodak Lightfast Magenta 1 (CAS #251959-65-6), C. I. Reactive Red 23, pacified C. I. Reactive Red 23, C. I. Reactive Red 31, pacified C. I. Reactive Red 31, CAS #182061-89-8, Acid Red 80, Acid Red 82, Nippon Kayaku JPD EK-1 (CAS#224628-70-0) or CAS#212080-60-9, or mixtures thereof.

The ink set may further comprise a light yellow ink. Preferably the light yellow ink comprises a carrier and yellow dye I or II, or mixtures thereof. The ink set may further comprise a light black (gray) ink comprising a carrier and a metal complex black dye, a carbon black pigment, a self-dispersing carbon black pigment or mixtures thereof.

In general, the inks of this invention comprise the above dyes at concentrations of 0.1 to 15%, preferably 0.4 to 6% by weight of the ink jet ink composition.

A humectant is usually employed in the ink jet compositions of the invention to help prevent the ink from drying out or crusting in the orifices of the print head. Examples of humectants which can be used include polyhydric alcohols, such as ethylene glycol, diethylene glycol (DEG), triethylene glycol, propylene glycol, tetraethylene glycol, polyethylene glycol, glycerol, 2-methyl-2,4-pentanediol, 2-ethyl-2- hydroxymethyl-1,3-propanediol (EHMP), 1,5 pentanediol, 1,2-hexanediol, 1,2,6-hexanetriol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether(DEGMBE); nitrogen-containing compounds, such as urea, pyrrolidin-2-one, N-methyl-pyrrolidin-2-one, 2-imidazolidone, and 1,3-dimethyl-2-imidazolidinone; and sulfur-containing compounds such as dimethyl sulfoxide, thioglycol, and tetramethylene sulfone.

Preferred humectants for the inks of the invention include DEG, glycerol, DEGMBE, TEGMBE, 1,2-hexanediol, 1,5-pentanediol, urea, 2-imidazolidone, pyrrolidin-2-one, EHMP and mixtures thereof. The humectant may be employed in each ink in an amount of from about 5 to about 60 weight percent of the ink composition.

Water-miscible organic solvents may also be added to the aqueous inks of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

The amount of aqueous carrier employed is in the range of approximately 40 to 98 weight %, preferably approximately 70 to 98 weight %, based on the total weight of the ink. In a preferred embodiment, the inks contain from about 5 to about 60 weight % of water miscible organic solvent. More preferably, the ink contains from about 10% to about 35% of water miscible organic solvent. Percentages are based on the total weight of the aqueous carrier.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. % or Kordek (Rohm and Haas Corp).

The pH of the aqueous ink compositions employed in the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.1–15%), water (20–95%), humectants (5–70%), water miscible co-solvents (2–20%), surfactants (0.1–10%), biocide (0.05–5%) and pH control agents (0.1–10%).

Additional additives which may optionally be present in the ink jet ink compositions employed in the invention include thickeners, conductivity enhancing agents, anti-kogation agents, drying agents, defoamers, anti-corrosion aids, viscosity modifying polymers, or sequestrants.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Inkjet printing methods, and related printers, are commercially available and need not be described in detail.

Ink jet inks of the present invention can be used in any of the popular ink jet printing systems, including thermal or piezoelectric drop-on-demand printers and continuous ink jet printers. Of course, the specific ink formulations will vary depending upon the type of ink jet printing system.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples are intended to illustrate, but not to limit, the present invention.

EXAMPLES

Preparation of Inks

Inks used in the invention and control inks were prepared by simple mixing of the ingredients. After thorough mixing, each ink was filtered with a 0.2 micron filter. The inks shown in table 1 were prepared. The yellow pyrazoleazoindole dye used in example ink 8 of table 1 (shown above as Dye A) was synthesized according to the method described in U.S. Pat. No. 6,468,338 B1. The yellow azo pyrazole-triazole dyes used in inks 9 and 10 of table 1 (shown above as Dyes B and C respectively) were synthesized according to the method described in U.S. patent application Publication Ser. No. 10/732,093, filed Dec. 10, 2003, incorporated herein by reference.

TABLE 1

| ink # | color | dye class | dye | weight % dye in ink |
|---|---|---|---|---|
| 1 | cyan | copper phthalocyanine | Direct Blue 199 [a] | 3.5 |
| 2 | cyan | copper phthalocyanine | Direct Blue 307 [b] | 3.5 |
| 3 | magenta | anthrapyridone | Nippon Kayaku JPD EK-1 [c] | 4.0 |
| 4 | magenta | anthrapyridone | Acid Red 82 [d] | 4.0 |
| 5 | magenta | azo-naphthol | Magenta M-377 [e] | 4.0 |
| 6 | magenta | metal complex | Reactive Red 23 [f] | 4.0 |
| 7 | magenta | metal complex | Kodak Light Fast Magenta 1 [g] | 1.0 |
| 8 | yellow | pyrazoleazoindole | Dye A | 4.0 |
| 9 | yellow | azo pyrazole-triazole | Dye B | 6.0 |
| 10 | yellow | azo pyrazole-triazole | Dye C | 6.0 |
| 11 | black | polyazo metal complex | Pacified Reactive Black 31 [h] | 4.0 |
| 12 | black | disazo metal complex | K-1334 [i] | 4.0 |
| 13 | black | trisazo metal complex | Duasyn ® NB-SF [j] | 4.0 |

[a] available as Duasyn ® Direct Turquoise Blue FRL Liquid from Clariant Corp., a 10 wt. % dye solution in water
[b] available as Pro-Jet ® Fast Cyan 2 from Avecia Inc., a 6 wt. % dye solution in water
[c] available as a 10 wt. % dye solution in water from Nippon Kayaku Kabushiki Kaisha
[d] available as a 10 wt. % dye solution in water from Bayer Corp.
[e] available as a dry solid from Ilford Imaging Switzerland, GmbH
[f] available as Duasyn ® 3B-SF Liquid from Clariant Corp., a 15 wt. % dye solution in water
[g] available as a 5 wt. % dye solution in water from Eastman Kodak Co.
[h] available a 10 wt. % dye solution in water from Sensient Technical Colors, Inc.
[i] available as a 10 wt. % dye solution in water from Ilford Imaging Switzerland, GmbH
[j] available as a 20 wt. % dye solution in water from Clariant Corp.

Due to the relatively high mass absorptivity of the Kodak Light Fast Magenta 1 dye, only 1 wt. % was needed in the magenta ink to achieve satisfactory image density. In addition to the dyes, all of the inks in table 1 were prepared with 23 wt. % glycerol, 7.0 wt % triethylene glycol mono-butyl ether, 0.3 wt. % triethanolamine and 0.09 wt. % lactic acid with the balance being water.

As comparative examples, the inks in table 2 were prepared.

TABLE 2

| ink # | color | dye | weight % dye |
|---|---|---|---|
| C-1 | cyan | Acid Blue 9 [l] | 3.5 |
| C-2 | magenta | Acid Red 52 [m] | 4.0 |
| C-3 | yellow | Acid Yellow 23 [n] | 2.75 |
| C-4 | yellow | Direct Yellow 132 [o] | 2.75 |
| C-5 | yellow | Direct Yellow 86 [p] | 2.75 |
| C-6 | yellow | Duasyn ® GF-SF [q] | 2.75 |

TABLE 2-continued

| ink # | color | dye | weight % dye |
|---|---|---|---|
| C-7 | black | Food Black 2 [r] | 4.0 |
| C-8 | black | Direct Black 168 [s] | 4.0 |

[l] available from Sensient Technical Colors as a 10 wt. % dye solution in water
[m] available from Sensient Technical Colors as a 10 wt. % dye solution in water
[n] available as Pro-Jet ® Yellow OAM from Avecia, Inc., a 7.5 wt. % dye solution in water
[o] available as Pro-Jet ® Yellow 1G from Avecia, Inc., a 7.5 wt. % dye solution in water
[p] available as a 10 wt. % dye solution in water from Sensient Technical Colors, Inc.
[q] available as a 4 wt. % dye solution in water from Clariant Corp.
[r] available from Sensient Technical Colors as a 10 wt. % dye solution in water
[s] available as Pro-Jet ® Direct Black 168 from Avecia, Inc., a 10 wt. % dye solution in water In addition to the dyes, all of the inks in table 2 were prepared with 23 wt. % glycerol, 7.0 wt % triethylene glycol mono-butyl ether, 0.3 wt. % triethanolamine and 0.09 wt. % lactic acid with the balance being water.

Evaluation of Inks

To evaluate the inks of the invention and the comparative inks, each ink was placed in an empty ink cartridge for a Canon Model S520 printer and printed using the Canon model S520 printer. A density scale was created by printing areas at 10%, 25%, 40%, 50%, 75% and 100% dot coverage. The inks of the invention and the comparative inks were printed onto Kodak Instant Dry Glossy media and Ilford Instant Dry (IDP1GP9) media. Approximately 1 day after printing, the printed media were laminated using Kodak Pro-Lustre lamination film.

Prior to lamination, each printed density patch and an unprinted area of both ink jet receiving media were measured for spectral reflectance density (from 380 nm to 730 nm) using a MacBeth-Gretag Spectrolino densitometer. The densitometer was set at D5000 illumination, 2 degree observer angle and no filter. The data thus obtained were transformed and normalized according to the method described in U.S. Pat. No. 5,679,140. As indicated in U.S. Pat. No. 5,679,140, the most desired yellow dye of an ink jet ink set gives a density between 0.9 and 1.0 at 450 nm and density between 0.8 and 1.0 at 470 nm. Thus yellow dyes capable of providing the highest color gamut must meet this specification. The results for the example yellow dyes of the invention ink jet ink set (inks number 8, 9 and 10) and comparative yellow inks (C-3, C-4, C-5, and C-6) are shown in table 3. In table 3, "O" indicates that the ink gives a density within the specification, "X" indicates that the ink does not give a density within the specification.

TABLE 3

| | Kodak Instant Dry Glossy Media | | Ilford Instant Dry Media | |
|---|---|---|---|---|
| Yellow Ink # | 0.9–1.0 density at 450 nm | 0.8–1.0 density at 470 nm | 0.9–1.0 density at 450 nm | 0.8–1.0 density at 470 nm |
| 8 | O | O | O | O |
| 9 | O | O | O | O |
| 10 | O | O | O | X |

TABLE 3-continued

| | Kodak Instant Dry Glossy Media | | Ilford Instant Dry Media | |
|---|---|---|---|---|
| Yellow Ink # | 0.9–1.0 density at 450 nm | 0.8–1.0 density at 470 nm | 0.9–1.0 density at 450 nm | 0.8–1.0 density at 470 nm |
| C-3 | O | O | O | X |
| C-4 | X | X | O | X |
| C-5 | X | X | O | X |
| C-6 | X | X | O | X |

As indicated in table 3 only yellow inks of the invention and comparative ink C-3 meet the specifications for desired densities on at least one of the ink jet receiving media types and only yellow inks 8 and 9 of the invention meet the specifications on both media types. As will be shown subsequently, although ink C-3 met the density specifications on Kodak Instant Dry Glossy media, its light fastness is well below what is desired.

To evaluate light fastness, each density patch was measured post lamination for the Status A visual, red, green and blue densities using a MacBeth-Gretag Spectrolino densitometer. The Kodak media and Ilford media were read in reflection mode. After measuring, the printed and laminated media were exposed to 50 kLux simulated daylight radiation for two weeks. High intensity exposure such as this is intended to provide an accelerated response to normal use conditions wherein the light exposure is of much lower intensity but the exposure is for a much longer duration. It is desired for each ink of the ink set to fade less than about 30% in density from a starting density of 1.0 on one or both of the media types used to evaluate the inks. Each density patch was then re-read after the high intensity exposure to assess the light fastness of each density patch. For cyan inks, the change in Status A red density was recorded, for the magenta inks the change in Status A green density was recorded, for the yellow inks the change in Status A blue density was recorded and for the black inks, the change in Status A visual density was recorded. The percent change in density from an initial starting density of 1.0 was determined by linear interpolation between areas with starting densities which were less than and greater than 1.0 density. Inks having less than about 10% fade are indicated with an A rating, from 10% fade to less than about 20% fade a B rating, from 20% fade to less than about 30% fade a C rating and 30% or more fade a D rating. The results for the inks of the invention and the comparative examples are shown in table 4.

TABLE 4

| | % density loss after 2 weeks exposure at 50 kLux daylight | |
|---|---|---|
| Ink # | Kodak Instant Dry Glossy media | Ilford Instant Dry media |
| 1 | B | A |
| 2 | B | A |
| 3 | B | C |
| 4 | C | C |
| 5 | B | C |
| 6 | B | D |
| 7 | B | B |
| 8 | A | B |

TABLE 4-continued

| | % density loss after 2 weeks exposure at 50 kLux daylight | |
|---|---|---|
| Ink # | Kodak Instant Dry Glossy media | Ilford Instant Dry media |
| 9 | A | A |
| 10 | B | A |
| 11 | A | A |
| 12 | A | A |
| 13 | A | A |
| C-1 | D | D |
| C-2 | D | D |
| C-3 | D | D |
| C-4 | C | A |
| C-5 | B | A |
| C-6 | B | B |
| C-7 | D | D |
| C-8 | D | D |

The inks of the invention set all show percent fade values from an initial density of 1.0 or less than about 30% on at least one of the media types. Comparative yellow ink C-3 although meeting the density specifications described above gave poor light fastness on both ink jet media. Comparative yellow inks C- 4, C-5 and C-6 provide good light fastness but are unacceptable for color as shown in table 3.

Thus an ink jet ink set comprising a cyan, magenta, yellow and black ink selected from among the inks of the invention will provide laminated prints with only slight color shifts due to light fade. Further, the ink set of the invention will give good color gamut based on meeting the specifications for yellow reflection density.

The invention has been described in detail with particular reference to useful embodiments thereof, but it will be understood that variations and modifications can be effected within the spirit and scope of the invention.

What is claimed is:

1. An ink jet ink set comprising:

a) a cyan ink comprising a carrier and a sulfonated copper phthalocyanine dye;

b) a magenta ink comprising a carrier and an anthrapyridone magenta dye or metal complex magenta dye, or azo-naphthol derivative magenta dye or mixtures thereof;

c) a yellow ink comprising a carrier and an azo pyrazoleazole yellow dye of the following structure (I):

I

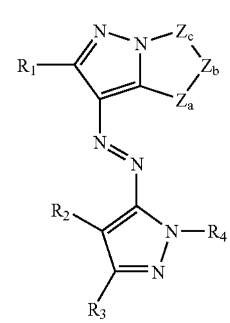

I wherein $R_1$ represents a hydrogen atom, a cyano group, an alkyl group, a cycloalkyl group, an alkenyl group, an aralkyl group, an aryl group, an alkylthio group, an arylthio group, an acyl group, a carboxyl group, a carbamoyl group, or a heterocyclic group;

Za is NH, Zb is $C(R_8)$ and Zc is N═;$R_8$ represents a hydrogen, an alkyl group, an alkenyl group, an alkynyl group, an aryl group or a heterocyclic group;

$R_2$ represents a hydrogen, an alkyl group, an aryl group, a halogen, a cyano group, a carboxyl group, an acyl group, a carbamoyl group, a nitro group, an alkyl or aryl sulfone group, a sulfonic acid group, a primary or secondary alkyl sulfonamide group, a aryl sulfonamide group or a heteroaryl group;

$R_3$ is a hydrogen or any non-metallic group;

$R_4$ is hydrogen, an alkyl group, a cycloalkyl group, an alkenyl group, an aralkyl group, an alkynyl group, an aryl group, a heterocyclic group, a urethane, a sulfoalkyl or sulfoaryl group; or a pyrazoleazoindole yellow dye of the following structure (II);

(II)

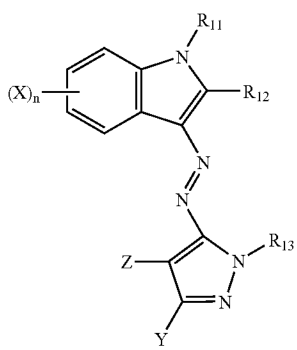

(II)s wherein $R_{11}$ and $R_{13}$ each independently represents hydrogen, an alkyl group of 1–6 carbon atoms, an allyl group, an aryl group of 6–10 carbon atoms, a heteroaryl group of 5–10 atoms or a polyoxyalkylene group of 2–20 alkylene oxide residues;

$R_{12}$, X and Y each independently represents hydrogen, an alkyl group of 1–6 carbon atoms, an allyl group, an aryl group of 6–10 carbon atoms, a heteroaryl group of 5–10 atoms, or a halogen, a cyano group, a carboxy group, an acyl group, a nitrogroup, a sulfo group, an alkoxy group of 1–6 carbon atoms, an aryloxy group of 6–10 carbon atoms, an alkoxy- or aryloxy-carbonyl group of 1–10 carbon atoms, a polyoxyalkylene group of 2–20 alkylene oxide residues, a ureido group, a carbamoyl group, analkyl-, arylalkyl-, aryl-, diaryl- or dialkyl-carbamoyl group of 1–20 carbon atoms, a sulfamoyl group, an alkyl-, arylalkyl-, aryl-, diaryl- or dialkyl-sulfamoyl group of 1–20 carbon atoms, an alkyl- or arylsulfonyl group, an acylamino group, a sulfonylamino group, an amino group, or an alkyl-, aralkyl-, aryl-, diaryl- or dialkyl-amino group of 1–20 carbon atoms;

n represents an integer from 1–4; and Z represents a cyano group, a carboxy group, a sulfo group, an alkoxycarbonyl group, a carbamoyl group, a sulfamoyl group, an alkyl- or arylsulfonyl group, an alkyl-, arylalkyl-, aryl-, diaryl- or dialkyl-sulfamoyl group of 1–20 carbon atom or an alkyl-, arylalkyl-, aryl-, diaryl- or dialkyl-carbamoyl group of 1–20 carbon atoms;

with the proviso that the dye of structure (I) and (II) must contain at least one group capable of imparting water solubility at a pH of about 4–9 and said dyes may contain a counterion if necessary; or mixtures of (I) and (II) above and;

d) a black ink comprising a carrier and a metal complex black dye.

2. The ink jet ink set of claim 1 wherein the yellow dye is represented by Structure I.

3. The ink jet ink set of claim 1 wherein the yellow dye is represented by Structure II.

4. The ink jet ink set of claim 2 wherein $R_1$ is an alkyl group.

5. The ink jet ink set of claim 2 wherein $R_2$ is a cyano group, an acyl group, a carboxy or carboalkoxy group, or a sulfone.

6. The ink jet ink set of claim 2 wherein $R_3$ is H or an alkyl group having four or fewer carbon atoms.

7. The ink jet ink set of claim 2 wherein $R_1$ is an alkyl group, $R_2$ is a cyano group, an acyl group, a carboxy or carboalkoxy group, or a sulfone; and $R_3$ is H or an alkyl group having four or fewer carbon atoms.

8. The ink jet ink set of claim 2 wherein the azo pyrazole-triazole yellow dye is represented by structure Ia:

Ia

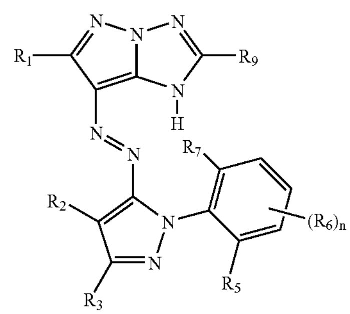

Ib

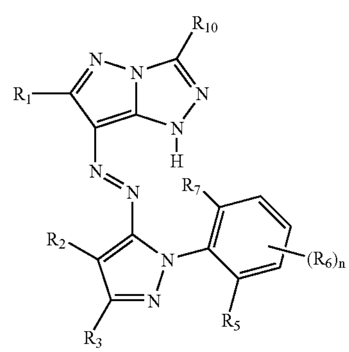

wherein $R_1$, $R_2$, and $R_3$ are as defined in claim 2, $R_5$, $R_6$, $R_7$ may independently be H or any non-metallic group, with the proviso that at least one of $R_5$ or $R_7$ represents an ionizable group which is capable of imparting water solubility to the dye or $R_5$ and $R_6$ or $R_6$ and $R_7$ together may form a carbocyclic or heterocyclic ring that is fused to the aromatic ring attached to the pyrazole nitrogen with the proviso that at least one group capable of imparting water solubility to the dye is present in any position of either fused ring or any two adjacent $R_6$ may form a carbocyclic or heterocyclic ring that is fused to the aromatic ring attached to the pyrazole nitrogen in any two adjacent positions not occupied by $R_5$ or $R_7$, with the proviso that at least one of $R_5$ or $R_7$ represents an ionizable group which is capable of imparting water solubility to the dye, and n is 0–3;

$R_9$ represents a hydrogen, an alkyl group, an alkenyl group, an alkynyl group or a heterocyclic group.

9. The ink jet ink set of claim 8 wherein $R_1$, and $R_9$ are alkyl groups.

10. The ink jet ink set of claim 8 wherein at least one of $R_5$, $R_6$ and $R_7$ are sulfonate, sulfinate, carboxylate, hydroxyl, phosphonate, or substituted sulfonamide.

11. The ink jet ink set of claim 8 wherein $R_1$ is an alkyl group.

12. The ink jet ink set of claim 8 wherein $R_2$ is a cyano group, an acyl group, a carboxy or carboalkoxy group, or a sulfone.

13. The ink jet ink set of claim 8 wherein $R_3$ is H or an alkyl group having four or fewer carbon atoms.

14. The ink jet ink set of claim 8 wherein $R_5$ or $R_7$ is a sulfonate group and $R_6$ is a sulfonate or carboxylate group in a position para to the $R_5$ or $R_7$ group.

15. The ink jet ink set of claim 8 wherein $R_9$ represents a hydrogen, an alkyl group or an alkenyl or alkynyl group.

16. The ink jet ink set of claim 15 wherein $R_9$ represents a branched or straight chain alkyl group of up to 8 carbons and is substituted with a phenoxy group, and $R_1$ is a t-butyl group.

17. The ink jet ink set of claim 1 wherein the yellow dye has adequate water solubility to enable preparation of an ink formulation containing between 0.2% and 10% dye.

18. The ink jet ink set of claim 8 wherein the yellow dye has adequate water solubility to enable preparation of an ink formulation containing between 0.2% and 10% dye.

19. The ink jet ink set of claim 3 wherein $R_{11}$ in the above formula represents hydrogen, a methyl group of a 2-carboxyethyl group.

20. The ink jet ink set of claim 3 wherein $R_{12}$ is a methyl or phenyl group.

21. The ink jet ink set of claim 3 wherein X is hydrogen, sulfo, a substituted 1,3,5-triazinylamino group or an N-alkylphthalamido group.

22. The ink jet ink set of claim 3 wherein $R_{13}$ is a 4-sulfophenyl, 2,5-bis-sulfophenyl, methyl, phenyl, 4-carboxyphenyl or 3-sulfopropyl group.

23. The ink jet ink set of claim 3 wherein Y is hydrogen.

24. The ink jet ink set of claim 3 wherein Z is a cyano, carboxy or carbamoyl group.

25. The ink jet ink set of claim 3 wherein $R_{11}$ is hydrogen, methyl or 2-carboxyethyl; $R_{12}$ is methyl or phenyl; X is hydrogen, sulfo, a substituted 1,3,5-triazinylamino group or an N-alkylphthalamido group; $R_{13}$ is a 4-sulfophenyl, 2,5-bis-sulfophenyl, methyl, phenyl, 4-carboxyphenyl or 3-sulfopropyl group; Y represents hydrogen and Z is a cyano, carboxy or carbamoyl group.

26. The ink jet ink set of claim 1 wherein the yellow dye is:

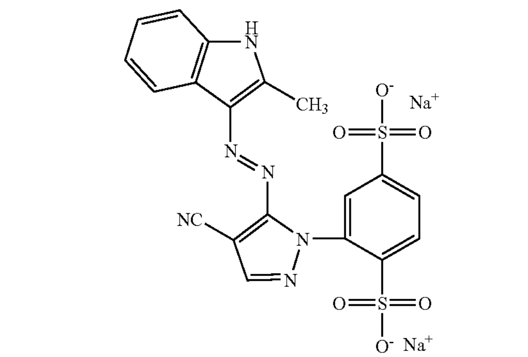

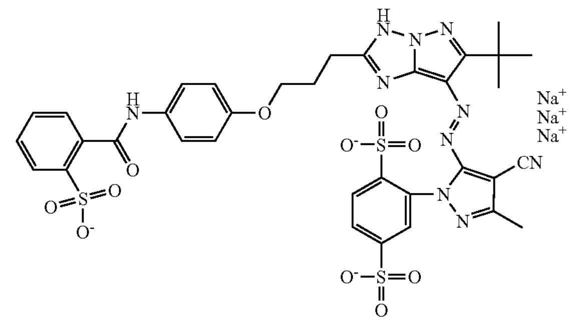

or

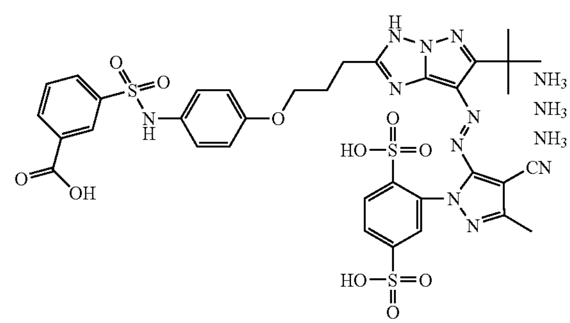

27. The ink jet ink set of claim 1 wherein the metal complex black dye in the black ink is a) Reactive Black 31, or Pacified C. I. Reactive Black 31 represented by Structure III, IV, or V:

(III)

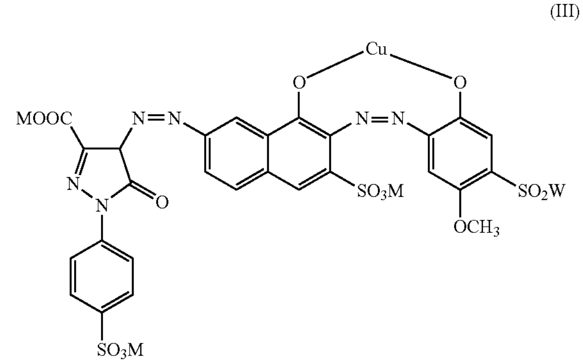

wherein W is —$CH_2CH_2$—OH, —CH═$CH_2$, an aminoalkyl group; or a sulfoalkyl group;

(IV)

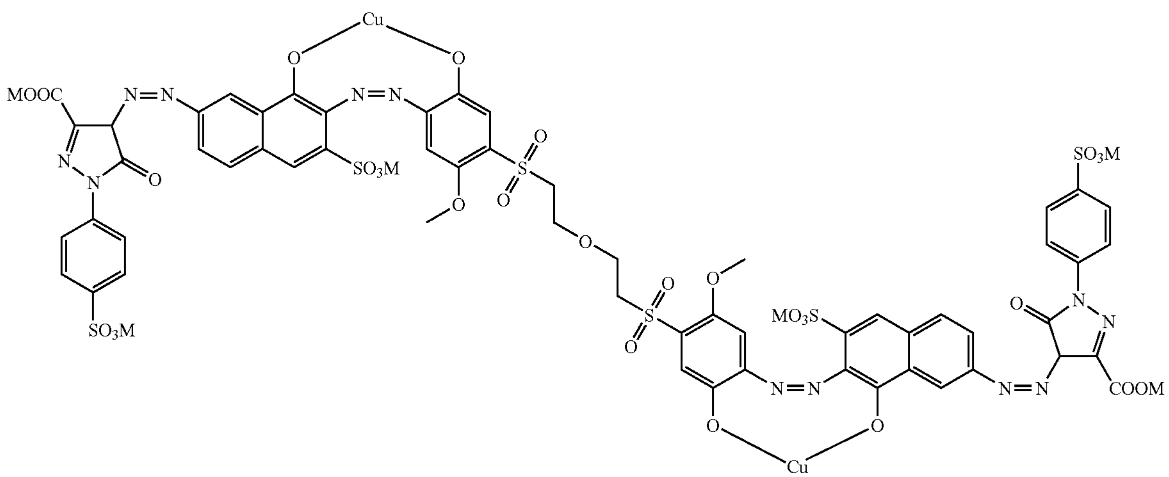

(V)

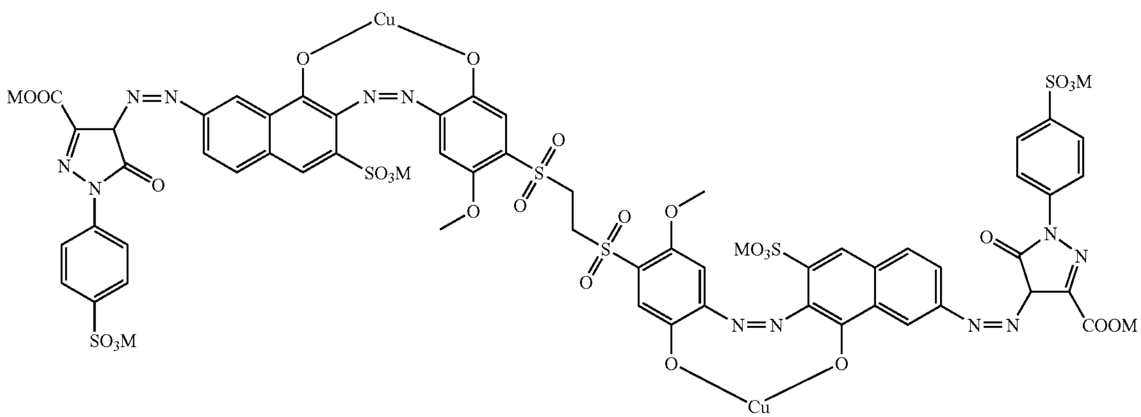

wherein M is H, Li, Na, K, $NH_4$ or alkylammonium or any combination thereof;

c) a metal complex bisazo black dye represented by Structure (VI):

(VI)

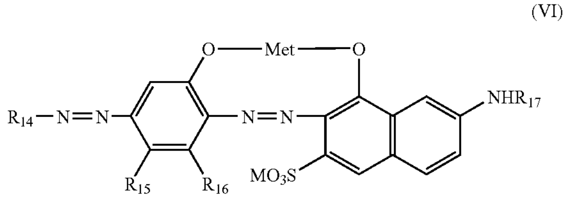

where $R_{14}$ is a phenyl group or naphthyl group;

$R_{15}$ is H, an alkyl group or an alkoxy group with 1 to 18 carbon atoms, an amino group, a halo group, a trifluoromethyl group, a carboxy group, a sulfo group, a carbamido group, an alkylcarbonylamino or arylcarbonylamino group; $R_{16}$ is hydrogen or $R_{15}$ forms together with $R_{16}$ and the phenylene ring a 1,4-naphthylene moiety, which can be unsubstituted or substituted in position 6 or 7;

$R_{17}$ is H, an alkyl group with 1 to 18 carbon atoms, a cycloalkyl group, a heterocyclic alkyl group, an aryl group, an aralkyl group, a saturated or unsaturated aza, oxa or hetercyclic radical;

M is hydrogen, a metal cation, an ammonium cation, or an ammonium cation substituted with an alkyl, alkoxyalkyl or hydroxyalkyl radical each having 1 to 12 carbon atoms; and Met is Cu, Ni, or Zn;

d) or a trisazo metal complex black dyes represented by Structure (VII):

(VII)

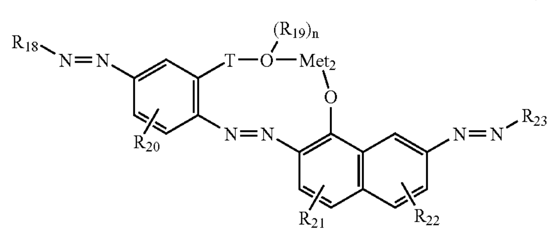

wherein $Met_2$ is a metal atom; $R_{18}$ is a phenyl or naphthalene radical substituted by 1, 2 or 3 substituents selected from the group consisting of OH, an O(alkyl) group having 1 to 6 carbon atoms, COOM, $SO_3M$ and $NH_2$;

$R_{19}$ is an alkyl group of 1 to 6 carbon atoms,

T is a chemical bond or —CO— or —$SO_2$—;

$R_{20}$ is H, a methyl group or an O(alkyl) group having $_1$ to 6 carbon atoms;

$R_{21}$ and $R_{22}$ are each independently H, COOM or $SO_3M$;

$R_{23}$ is a phenyl, pyridyl or pyrazole radical substituted by 1,2 or 3 substituents selected from the group consisting of OH, an O(alkyl) group having 1 to 6 carbon atoms, COOM, $SO_3M$, $NH_2$, an NHaryl group, an NHacyl group and a phenlysulfo group;

n is 0 or 1, and M is ammonium, H, K, Li, or Na:

or mixtures of any number of dyes a), b), c), or d).

28. The inkjet ink set of claim 27 wherein the black ink comprises a carrier and Pacified Reactive Black 31 or a dye of structure VIII or structure IX or mixtures thereof,

VIII

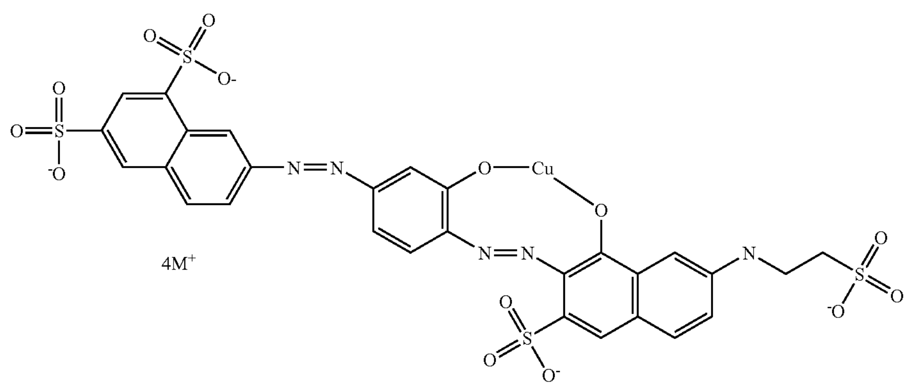

IX

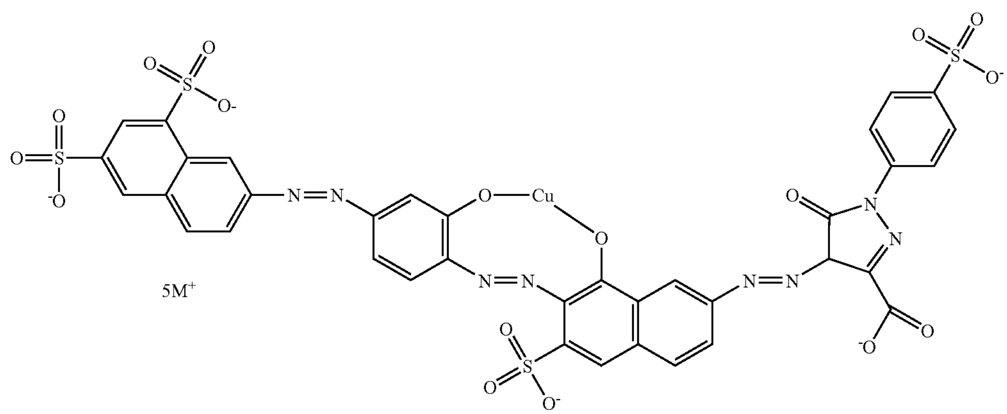

wherein M in is Li, Na, K, $NH_4^+$ or any combination thereof.

29. The ink jet ink set of claim 1 wherein the cyan ink comprises a carrier and C. I. Direct Blue 86, C. I. Direct Blue 199, or C. I. Direct Blue 307 or mixtures thereof.

30. The ink jet ink set of claim 1 wherein the magenta ink comprises a carrier and (CAS #251959-65-6), C. I. Reactive Red 23, pacified C. I. Reactive Red 23, C. I. Reactive Red 31, pacified Reactive Red 31 or CAS #182061-89-8, (CAS#224628-70-0), Acid Red 80, Acid Red 82, or CAS#212080-60–9 or mixtures thereof.

31. The ink jet ink set of claim 2 wherein the black ink comprises at least one metal complex black dye and at least one yellow dye selected from dyes I and II.

32. The ink jet ink set of claim 1 wherein the ink set further comprises a light cyan ink and a light magenta ink.

33. The ink jet ink set of claim 32 wherein the light cyan ink comprises a carrier and a sulfonated copper phthalocyanine dye.

34. The ink jet ink set of claim 33 wherein the light cyan ink comprises a carrier and C. I. Direct Blue 86, C. I. Direct Blue 199, or C. I. Direct Blue 307 or mixtures thereof.

35. The ink jet ink set of claim 32 wherein the light magenta ink comprises a carrier and an anthrapyridone magenta dye, a metal complex magenta dye or an azonaphthol derivative magenta dye, or a mixture thereof.

36. The ink jet ink set of claim 32 wherein the light magenta ink comprises a carrier and (CAS #251959-65-6), C. I. Reactive Red 23, pacified C. I. Reactive Red 23, C. I. Reactive Red 31, pacified C. I. Reactive Red 31, CAS #182061-89-8, Acid Red 80, Acid Red 82, (CAS#224628-70-0) or CAS#212080-60-9, or mixtures thereof.

37. The ink jet ink set of claim 32 wherein the ink set further comprises a light yellow ink.

38. The ink jet ink set of claim 37 wherein the light yellow ink comprises a carrier and yellow dye I or II, or mixtures thereof.

39. The ink jet ink set of claim 1 wherein the ink set further comprises a light black (gray) ink comprising a carrier and a metal complex black dye, a carbon black pigment, a self-dispersing carbon black pigment or mixtures thereof.

40. The ink jet ink set of claim 1 wherein the carrier comprises water and water soluble organic solvents, humectants or a combination thereof.

41. The ink jet ink set of claim 40 wherein the humectants are selected from the group consisting of diethylene glycol, glycerol, diethylene glycol monobutyl ether, triethylene glycol monobutyl ether, 1,2-hexanediol, 1,5-pentanediol, urea, 2-imidazolidone, pyrrolidin-2-one, 2-ethyl-2-hydroxymethyl-1,3-propanediol, and mixtures thereof.

42. The ink jet ink set of claim 41 wherein the concentration of humectants is 5% to 60% by weight.

43. The ink jet ink set of claim 40 wherein the carrier further comprises a non-ionic surfactant.

44. An ink jet printing method comprising the steps of A) providing an ink jet print that is responsive to digital signals; B) loading said printer with an ink jet recording element comprising a support having thereon an image receiving layer; C) loading said printer with an ink jet ink comprising the ink set according to claim 1; and D) printing on said image receiving layer using said ink jet ink compositions described in claim 1 in response to said digital data signals.

* * * * *